United States Patent [19]

Hoppenstedt

[11] 4,325,460

[45] Apr. 20, 1982

[54] EJECTOR MUFFLER

[75] Inventor: Bruce B. Hoppenstedt, Richfield, Minn.

[73] Assignee: Donaldson Company, Inc., Minneapolis, Minn.

[21] Appl. No.: 140,128

[22] Filed: Apr. 14, 1980

[51] Int. Cl.³ .......................... F01N 1/14; B05B 7/06; F15D 1/02

[52] U.S. Cl. ...................................... 181/259; 55/276; 55/431; 55/468; 138/39; 138/44; 239/432; 239/590

[58] Field of Search .......................... 181/259, 262–263; 138/37, 39, 44, 45; 55/276, 385 B, 431, 466, 468, DIG. 16, DIG. 21; 239/428.5, 432, 434, 589–590; 406/144

[56] References Cited

U.S. PATENT DOCUMENTS

| | | | |
|---|---|---|---|
| 2,391,863 | 1/1946 | Bowen | 55/466 X |
| 2,683,622 | 7/1954 | Dragon | 138/44 X |
| 3,104,736 | 9/1963 | Ludlow et al. | 138/37 X |
| 3,118,517 | 1/1964 | Ludlow et al. | 138/37 X |
| 3,137,553 | 6/1964 | Billey | 55/431 |
| 3,419,892 | 12/1968 | Wagner et al. | 55/290 |
| 4,142,606 | 3/1979 | Vanderzanden et al. | 181/262 X |
| 4,147,230 | 4/1979 | Ormond et al. | 181/262 |

FOREIGN PATENT DOCUMENTS 561067 4/1930 Fed. Rep. of Germany ...... 406/144
172450 8/1960 Sweden ................................ 138/44

OTHER PUBLICATIONS

Print 5085 G116, Muffler Outline, Donaldson Co. Inc.
Print EEH001281, Ejector Assembly, Donaldson Co. Inc.
Print EEH001034, Exhaust Ejector Assembly, Donaldson Co., Inc.
Print 5085 G112, Muffler Assembly, Donaldson Co. Inc.

*Primary Examiner*—L. T. Hix
*Assistant Examiner*—Thomas H. Tarcza
*Attorney, Agent, or Firm*—Merchant, Gould, Smith, Edell, Welter & Schmidt

[57] ABSTRACT

An ejector comprising a housing (30, 81) and an ejector insert (40, 82) received therein to form a venturi which is eccentric with the housing, and a muffler-ejector assembly (25), including such an ejector (80), so mounted that the inlet axis (78) of the exhaust tube (71) may be made to approach or even coincide with the axis (59) of the casing (60) without enlarging the lateral dimensions of the latter.

16 Claims, 11 Drawing Figures

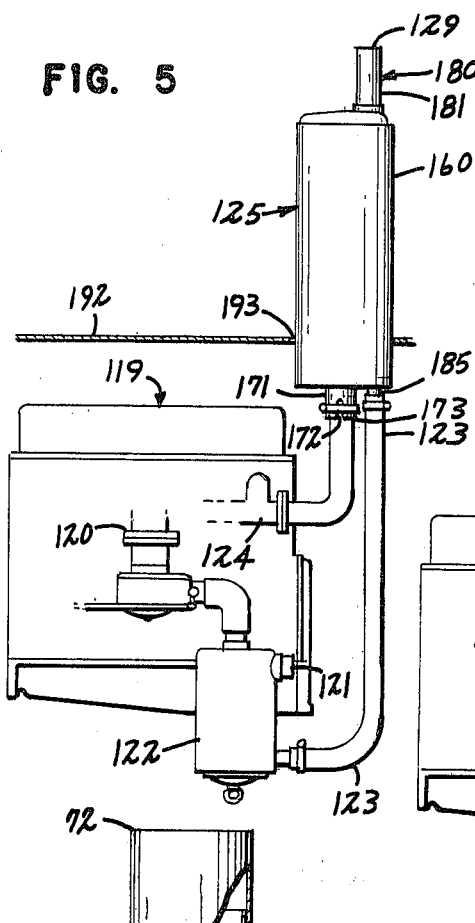
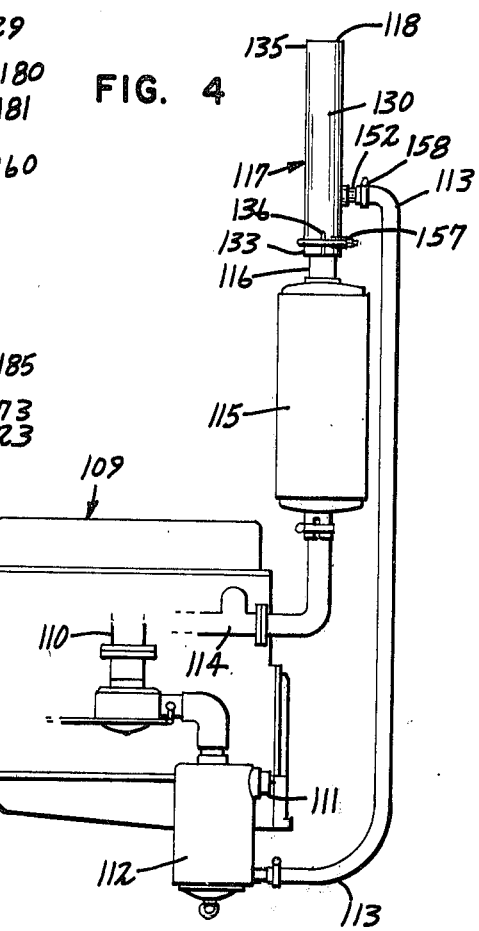
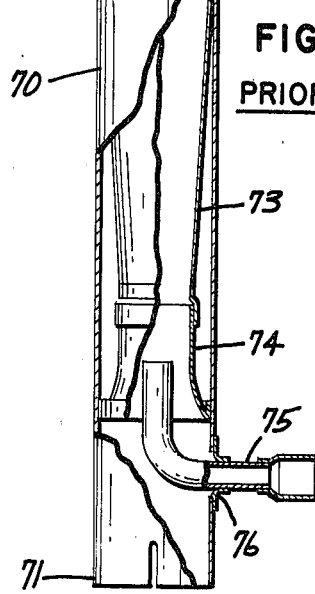
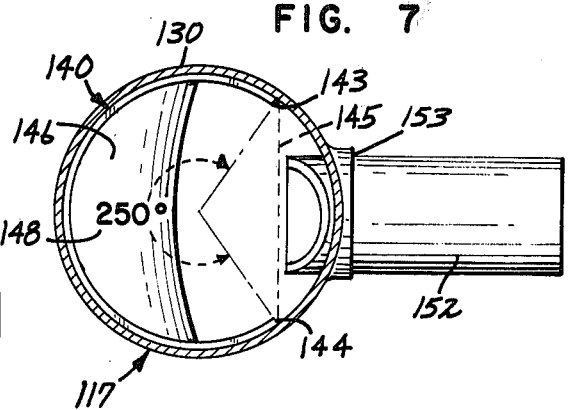

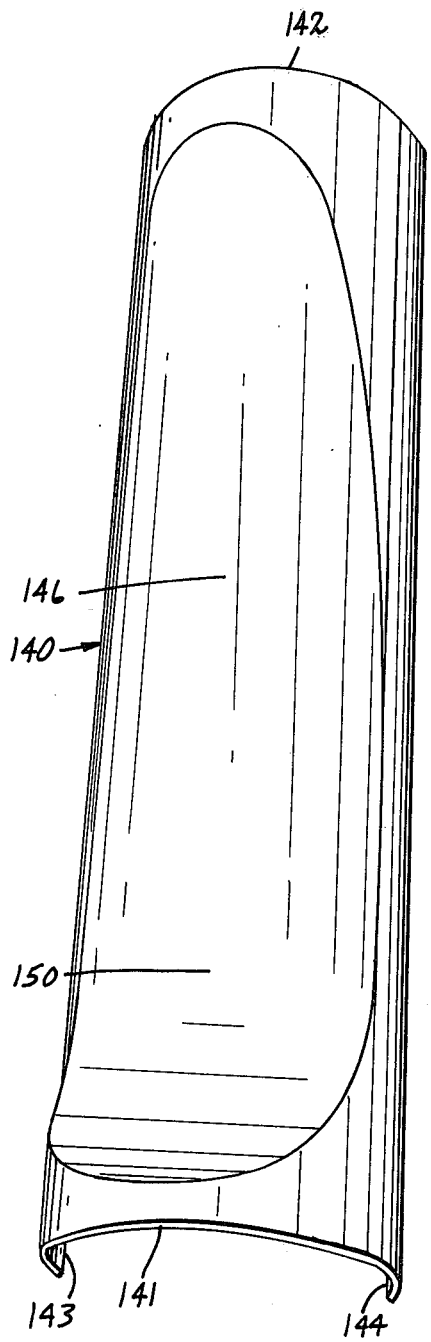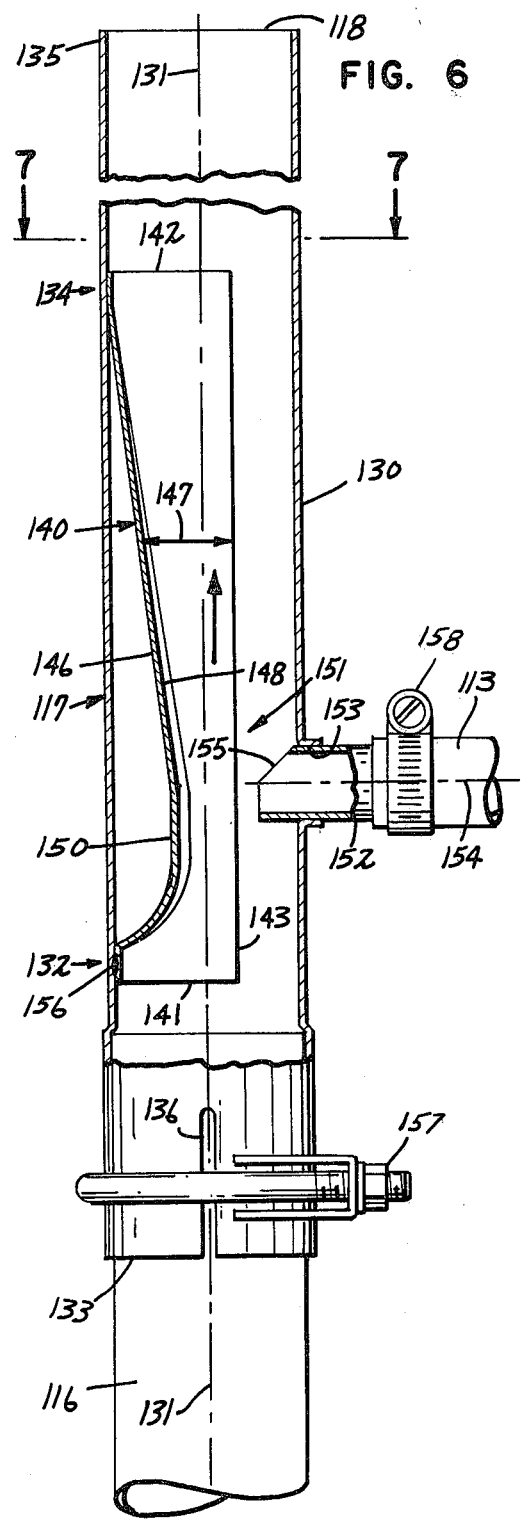

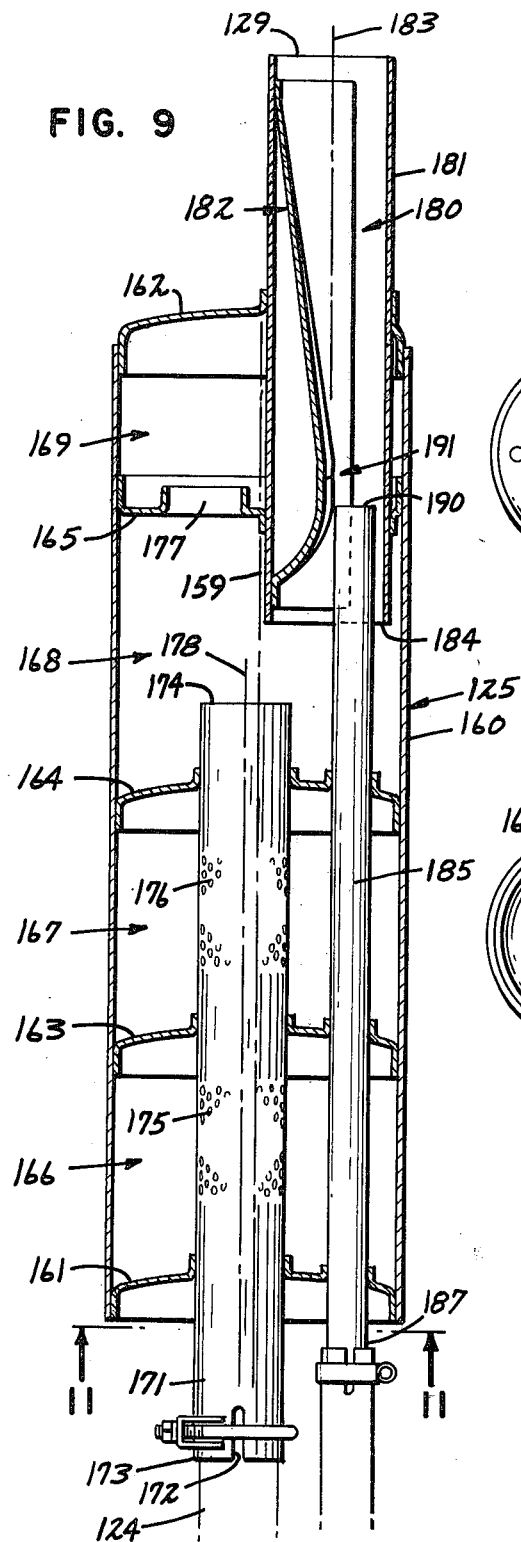
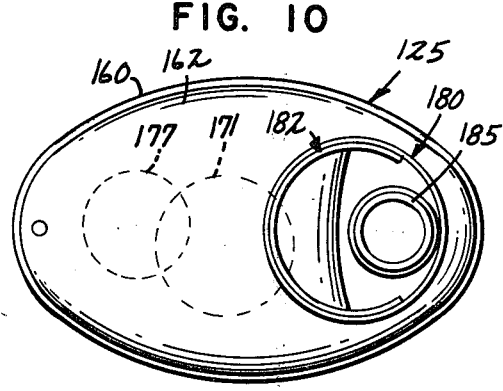
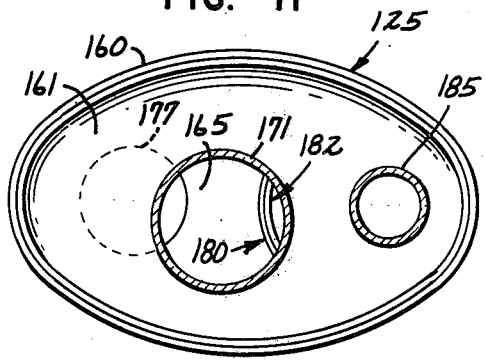

EJECTOR MUFFLER

TECHNICAL FIELD

This invention relates to the field of mufflers and muffler-ejectors for use with internal combustion engines of agricultural machinery or the like. Such devices are used respectively to reduce the noise output from such engines, and to combine with that function the further function of scavenging, from an air cleaner of suitable design, the particles of dirt, grit and chaff separated therein from the air to be admitted to the engine for combustion of fuel.

BACKGROUND OF THE PRIOR ART

Many engine air cleaners are designed so that particulate matter separated from the air may be continuously removed or scavenged through a negative pressure connection to the cleaner, and it is known that a suitable negative pressure for this purpose can be obtained by inserting a venturi into the engine exhaust channel. U.S. Pat. No. 3,137,553 to Billey teaches an ejector arrangement of this sort. U.S. Pat. No. 3,419,892 to Wagner et al. teaches that the functions of muffling and ejection can be obtained in a single exhaust ejector unit, as will be discussed in more detail below. The Wagner structure is compact and efficient, but is somewhat expensive to manufacture and assemble, and also is not susceptible of design so that the intake for combustion gases is centered on the unit. This means that when the unit is mounted in its usual fashion, with its longitudinal axis vertical, the considerable weight of the unit is effectively off-axis, which makes for some mechanical instability and strain on the interconnections involved, under the conditions of vibration associated with the operation of such equipment, and may require accessory mounting brackets or braces in some installations. An alternative expedient of intricate internal structure known in the art, and as more fully described herein) supplies the combustion gases centrally at one end of a muffler-ejector structure having an ejector built centrally into the other end, the scavenging air being conducted through the muffler to the ejector at an off-center site.

SUMMARY OF THE INVENTION

This invention comprises an ejector having a venturi which is eccentric, and a muffler-ejector assembly in which advantage is taken of the eccentric design to provide a unit in which the intake for combustion gases can be positioned as near to the center of the unit as is desired, in order to give a structure which is better balanced and stronger in use. The unit retains the high quality and efficiency of the Wagner prior art structure, while adding the advantages of a central input connection and reduced manufacturing costs inherent in the eccentric design. It has great advantages over the second prior art structure in that the number of individual parts is much smaller and their assembly into a complete unit is much easier and less subject to separation and leakage.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals indicate corresponding parts throughout the several views, FIGS. 1, 2 and 3 are longitudinal sectional views of prior art structures;

FIG. 4 is a schematic showing of a first embodiment of the present invention in its intended use;

FIG. 5 is a similar showing of a second embodiment of the invention in use;

FIG. 6 shows a component of FIG. 4 in longitudinal section;

FIG. 7 is an end view in section along the line 7—7 of FIG. 6;

FIG. 8 is a perspective view of a component of FIG. 6;

FIG. 9 shows a component of FIG. 5 in longitudinal section;

FIG. 10 is an end view of the structure of FIG. 9; and

FIG. 11 is a sectional view along the line 11—11 of FIG. 9.

DESCRIPTION OF THE PREFERRED EMBODIMENTS

Figure 1:
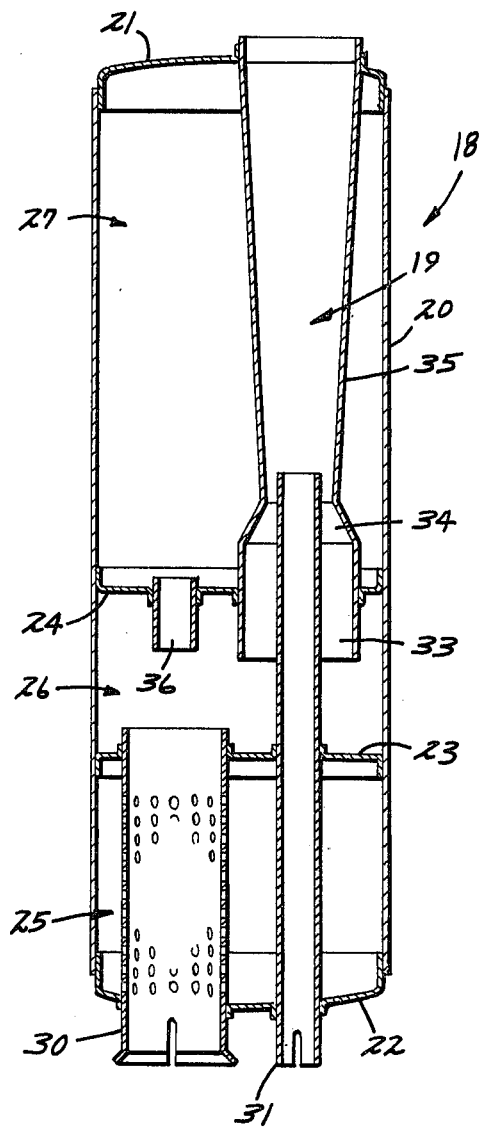

An understanding of the present invention will be facilitated by a brief consideration of prior art structures. FIG. 1 shows the structure of Wagner et al. to comprise a muffler 18 with an ejector 19 built therein. The muffler comprises a casing 20 extending along a longitudinal axis between end plates 21 and 22 and having internal baffle plates 23 and 24 to define chambers 25, 26 and 27. End plate 22 and baffle plate 23 are apertured to pass a perforated exhaust tube 30, through which combustion gases are admitted, and an air intake tube 31, for supplying negative pressure to scavenge an air cleaner. End plate 21 and baffle plate 24 are apertured to pass ejector 19, which comprises an inlet portion 33, a throat 34, and an ejector tube 35, aligned along and concentric about an axis parallel to the axis of casing 20. Communication between chambers 26 and 27 is provided by a tube 36. Exhaust tube 30 and inlet portion 33 both open into chamber 26, and tube 31 opens into throat 34 of ejector 19.

It is evident that with this structure exhaust tube 30 cannot be located centrally, unless the overall transverse dimension of the casing is practically doubled—not an economically feasible option. It is also evident that the structure made up of elements 33, 34, and 35 is not susceptible of easy or inexpensive manufacture from commercially available materials.

Figure 2:
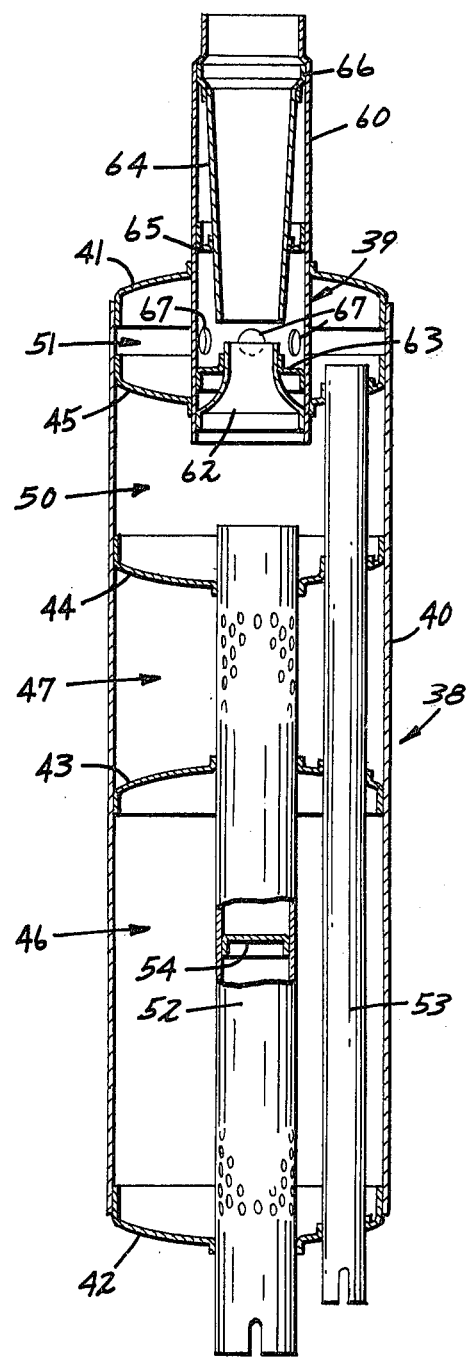

When it was appreciated that a concentric overall structure is desirable, resort was had to the design shown in FIG. 2. Here a muffler 38 with a central inlet has an ejector 39 built into its outlet end. Muffler 38 comprises a casing 40 extending along a longitudinal axis between end plates 41 and 42 and is divided by baffles 43, 44, and 45 into chambers 46, 47, 50 and 51. End plate 42 and baffles 43 and 44 are apertured to pass a perforated exhaust tube 52, through which combustion gases are admitted, and an air intake tube 53, for supplying negative pressure to scavenge an air cleaner. Tube 52 has an internal baffle 54.

End plate 41 and baffle plate 45 are apertured to pass the outer tube or housing 60 of ejector 39, within which a nozzle 62 is secured by a baffle 63, and a cone 64 is secured by baffles 65 and 66. A space exists between members 62 and 64, and tube 60 is provided with a ring of apertures 67 at this site. Baffle 45 is further apertured to pass the end of tube 53, which accordingly terminates in chamber 51. Flow of exhaust gases through tube 52, chamber 50, nozzle 62, tube 64, and cone 64 produces a negative pressure at the site of apertures 67, which corresponds to the throat 34 of FIG. 1, so that air is drawn into tube 53 to scavenge any air cleaner connected thereto.

It will be evident that this structure enables an exhaust tube 52 to be located centrally of the unit. However, the ejector structure with its considerable number of individual parts proved expensive to construct, assemble, and maintain.

Attention is now directed to one further prior art structure, an ejector for use independently of the presence or absence of a muffler for the engine gases, and shown in FIG. 3. Here a cylindrical housing 70 has a first end 71 at which exhaust gases are to be received and a second end 72 from which they are to be discharged. A venturi 73 concentric with housing 70 is mounted therein and has a throat 74. An air intake tube 75 extends transversely into housing 70, and then bends at a right angle to extend concentrically into throat 74. An adapter 76 is necessary to enable insertion of tube 75 into position while thereafter preventing residual leakage from decreasing the venturi effect. In this structure, as in those of FIGS. 1 and 2, components are necessary which are expensive to manufacture, install, and maintain properly operative.

Turning now to FIG. 4, an engine 109 includes an intake manifold 110 into which air for combustion is supplied from an inlet 111 through an air cleaner 112 having a scavenger tube 113 for removing by vacuum dirt extracted from the air. Engine 109 also has an exhaust manifold 114 which is connected to a muffler 115 for reducing the noise output of the engine at an exhaust pipe 116. An "add-on" ejector 117 according to my invention receives the exhaust from muffler 115 and derives therefrom a negative pressure which is supplied to scavenging tube 113 so that dirt extracted by cleaner 112 is discharged with the exhaust gases at an outlet 118.

In FIG. 5 an engine 119 includes an intake manifold 120 into which air for combustion is supplied from an inlet 121 through an air cleaner 122 having a scavenger tube 123 for removing by vacuum dirt extracted from the air. Engine 119 also has an exhaust manifold 124 which is connected to a muffler-ejector assembly 125 according to my invention for reducing the noise output at an outlet 129 and also deriving a negative pressure which is supplied to scavenger tube 123.

Turning now to FIGS. 6-8, ejector 117 is shown to comprise a cylindrical tubular housing 130 of circular section and substantially constant internal diameter, so that it extends smoothly along an axis 131 between a first site 132 spaced from an inlet end 133 and a second site 134 spaced from an outlet end 135. End 133 is provided with slots as at 136 to facilitate connection with exhaust pipe 116.

An ejector insert 140 of sheet metal is mounted in tube 130 to comprise therewith a venturi which is not radially symmetrical about axis 131, but is bilaterally symmetrical about a plane passing through the axis and aligned with the plane of the paper of FIG. 6. Insert 140 extends axially between an input end 141 at site 132 and an output end 142 of site 134. The insert has the general configuration of a hollow circular cylinder fitting within housing 130 and coaxial therewith. The cylinder is peripherally incomplete: its ends 141 and 142 comprise in transverse section peripherally incomplete circles centered on axis 131 and of angular extent greater than 180° and preferably about 250°. The edges 143 and 144 of insert 140 are straight lines parallel to axis 131, and define a truncating plane 145.

In addition to being truncated, insert 140 is deformed, between generally cylindrical portions of short axial length at ends 141 and 142. The deformation is configured, as indicated at 146, so that the space 147 between the inner surface 148 of the insert and truncation plane 145 (and hence the space between surface 148 and housing 130) decreases in cross-sectional area perpendicular to the axis from both ends toward an intermediate site 150 of minimum area. The rate of decrease is greater at end 141 than at end 142, so that site 150 is nearer to end 141 than to end 142. For a perspective showing of this, refer to FIG. 8.

Insert 140 cooperates with housing 130 to form a venturi 151 having its throat at site 150. An inlet conduit 152 is received in a lateral aperture 153 in the wall of tube 130, its axis 154 lying in the plane of symmetry and being perpendicular to the axis 131 at site 150. The inner end of conduit 152 is cut off at 45° at its downstream edge 155 to improve the efficiency of the ejection process performed by venturi 151. Note that conduit 152 needs only to pass through the wall of tube 130, since insert 140 is discontinuous in this area and need not be traversed.

Insert 140 is secured within tube 130 at inlet end 141, as by welding 156 between the two members at site 132. This permits some longitudinal relative movement of end 142 to accomodate differential thermal expansion: the insert's angular extent greater than 180° at end 142 prevents lateral movement of that end of the insert in tube 130.

While housing 130 has been shown to be of circular section and constant diameter, it will be appreciated that by appropriate modifications an insert 140 may be constructed to fit a housing of oval or other transverse section, or one which tapers axially, according to the wishes of the designer.

In use, end 133 is connected to exhaust pipe 116, as by a clamp 157, and tube 152 is connected to scavenger tube 113, as by a clamp 158, the axis of the unit being vertical. Passage of exhaust gas through tube 130 in the direction of arrow creates a negative pressure at throat site 150 which draws through tube 113 air containing separated dust from cleaner 12.

Attention is now directed to FIGS. 9-11, which shows unit 125 to comprise a muffler into which an ejector is incorporated. A casing 160 having an axis 159 is closed by end plates 161 and 162 and divided baffles 163, 164, and 165 into chambers 166, 167, 168 and 169. An exhaust tube 171 having slots 172 at an end 173 extends in sealed relation through end plate 161 and baffles 163 and 164 to open at end 174 into chamber 168. Fields of perforations in tube 171 are shown at 175 and 176, and communicate with chambers 166 and 167, respectively. Communication between chambers 168 and 169 is enabled by an aperture 177 in baffle 165. As shown in the drawing, the axis 178 of tube 171 is parallel and close to axis 159: if desired, the axes may coincide.

An ejector 180 is incorporated into unit 125 and comprises a housing 181 and an insert 182. Housing 181 is cylindrical about an axis 183 and extends in sealed relation through end plate 162 and baffle 165 into chamber 168. Inwardly, housing 181 terminates at an end 184 axially spaced from end 174 of tube 172. Insert 182 is configured and mounted in housing 181 as described in connection with insert 140 and housing 130, except that the housing does not have a lateral aperture for an inlet conduit: in this embodiment of the invention an inlet conduit 185 having a first end 187 outside of end plate 161 extends in sealed relation through the end plate and baffles 163 and 164 and through chamber 168 into housing 181, its end 190 lying at or near the throat 191 of the venturi formed by housing 181 and insert 182.

Apparatus according to FIGS. 9–11 is designed for use with the engines of agricultural machinery. The engine is conventionally contained within and below a sheathing suggested at 192 in FIG. 5, exhaust manifold 124 being directed upwardly to support unit 125, which extends through a suitably formed aperture 193 in sheathing 192 so that its greater portion is outside the sheathing for improved cooling. To prevent the ingress of chaff and other undesirable matter into the machine at aperture 93, the fit of unit 125 therein should be reasonably close, and undue vibration therebetween should not exist. This means that for mechanical reasons such as strength and vibration reduction the axis of tube 171 should depart from the central axis of casing 160 only enough to compensate for the fact that members 181, 182, and 185 are all off axis in the same direction.

The arrangement by which ejector 180 is constructed to be radially asymmetrical enables conduit 185 to be positioned very near to casing 160, so that the tube 171 can be desirably near the central axis. It is also clear that the possibility of rotating insert 182 in housing 181 before assembly gives design freedom for the location of conduit 185 relative to axis 159, while the conduit remains in the proper relation to the throat of the venturi.

In use the combustion gases from the engine are supplied to tube 171, and flow therethrough into chamber 168 and then through housing 181 to discharge. Sound reduction is accomplished by perforations 175 associated with chamber 166, perforations 176 associated with chamber 167, and aperture 177 associated with chamber 169, in standard muffler fashion. The flow of gas in throat 191 creates a negative pressure there which draws air through conduit 185, drawing dust from cleaner 122 through scavenger tube 123 and discharging it with the combustion gases.

From the above it will be evident that I have invented an improved structure for use in ejectors and mufflers to give a mechanically stronger and more balanced arrangement, while retaining the dimensions at previous values and insuring that the completed structures will fit in machines designed for earlier, less perfect arrangements.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A muffler-ejector assembly comprising, in combination:
   a muffler having a casing elongated along a first axis between first and second ends, first and second end plates closing said ends, and an exhaust tube extending generally axially through said first end plate to open into said casing;
   an ejector including a tubular housing extending along a second axis, offset from said first axis, through said second end plate to open into said casing and an ejector insert secured within said housing and configured for cooperation with a wall of said housing to define a venturi, having a throat offset from said second axis of the tubular housing;
   and an air intake tube extending through said casing having an end at said throat of said venturi.

2. An assembly according to claim 1 in which said ejector comprises:
   a tubular housing elongated along said second axis and having a substantially constant cross-section;
   and an ejector insert within said housing elongated along said axis and having a variable cross-section eccentric about said axis, so that the space between said housing and said insert decreases in cross-sectional area from both ends toward an intermediate site of minimum area, at said throat, to constitute a venturi.

3. An assembly according to claim 1 in which said insert is secured within said housing at only one end.

4. An assembly according to claim 1 in which said housing and said intake tube extend substantially parallel with said first axis.

5. A muffler-ejector assembly comprising, in combination:
   a muffler including a casing elongated along a first axis between first and second ends, first and second end plates closing said ends, and an exhaust tube extending substantially centrically through said first end plate to open into said casing;
   an ejector including a tubular housing, extending along a second axis through said second end plate offset from said first axis to open into said casing for flow of an ejection fluid from said exhaust tube therethrough, and an ejector insert within said housing elongated along said housing axis and having a variable cross-section such that the space between said housing and one face of said insert decreases in cross-sectional area from both ends toward an intermediate site of minimum area, to constitute a venturi having a throat at said site;
   and an air intake tube extending through said first end plate of said casing into said space to open into said venturi throat, for conducting fluid, to be ejected, into said space at said site.

6. An assembly according to claim 5 in which said ejector extends in alignment with said axis of said casing and is located adjacent the wall of said casing.

7. An assembly according to claim 5 in which said ejector insert has a surface configuration generally corresponding to a peripherally incomplete hollow cylinder extending about said second axis for more than 180 degrees, so that the ends of said insert comprise peripherally incomplete portions and the edges of said insert lie on lines connecting the ends of said insert and defining a truncating plane aligned with said second axis, said insert being so deformed between said ends that the space between a surface of said insert and the truncating plane decreases in transverse cross-sectional area from both ends of said insert toward an intermediate site of minimum area.

8. An ejector according to claim 5 in which said air intake tube is aligned with said housing axis.

9. An ejector according to claim 5 in which the cross-section of said housing is circular and the ends of said insert are configured in section as circular arcs of greater than 180° and of radius to fit snugly in said housing.

10. An ejector according to claim 5 in which said insert is secured within said housing at only one of said ends.

11. An ejector according to claim 5 in which said housing and said insert are bilaterally symmetrical in section about a selected plane passing through said second axis.

12. An ejector comprising, in combination:
a housing comprising a first elongated tubular member of uniform generally circular cross-section and of selected internal diameter;
an ejector insert comprising a second elongated member having the configuration of a peripherally incomplete hollow circular cylinder coaxial with said housing and extending longitudinally within said housing between first and second end portions having the cross-sections of incomplete circles of said selected diameter and of greater than 180° angular extent, terminating at edges which define a truncating plane parallel to said axis, said cylinder being so deformed, between said end portions, that the space between said housing and one face of said insert decreases sharply in cross-sectional area from one end of said insert to an intermediate site of minimum area, and increases more gradually from said site to the other end of said insert, to constitute a venturi;
means securing one end of said insert to said housing, the other end of said insert being free to move longitudinally with respect to said housing;
and conduit means for conducting fluid, to be ejected, into said space at said site.

13. An ejector according to claim 12 in which said conduit means extends transversely through said housing.

14. An ejector according to claim 12 in which said conduit means extends lengthwise into said housing.

15. In combination, an insert of predetermined length for forming a venturi with an elongated tubular member having an internal surface which extends smoothly along an axis between sites, spaced by the length of said insert, at which said member has predetermined transverse outlines;
said insert being mounted within said tubular member and having a surface configuration generally corresponding to a peripherally incomplete hollow cylinder extending about said axis between said sites for more than 180 degrees, so that the ends of said insert comprise peripherally incomplete portions of said outlines and the edges of said insert lie on lines connecting the ends of said insert and define a truncating plane aligned with said axis,
said insert being so deformed between said ends that the space between a surface of said insert and the truncating plane decreases in transverse cross-sectional area from both ends of said insert toward an intermediate site of minimum area which defines with said internal surface of said tubular member a throat of said venturi;
and conduit means for conducting fluid to be ejected into said throat.

16. An insert according to claim 15 in which the rate of decrease of said space in one direction is different from the rate of decrease in the other direction, so that said intermediate site is not midway between said ends.

* * * * *

UNITED STATES PATENT AND TRADEMARK OFFICE
CERTIFICATE OF CORRECTION

PATENT NO. : 4,325,460
DATED : April 20, 1982
INVENTOR(S) : Bruce B. Hoppenstedt It is certified that error appears in the above—identified patent and that said Letters Patent is hereby corrected as shown below:

Column 6, line 34, "centrically" should be --centrally--.

Signed and Sealed this

Third Day of August 1982

[SEAL]

Attest:

GERALD J. MOSSINGHOFF

*Attesting Officer*  *Commissioner of Patents and Trademarks*